No. 661,937. Patented Nov. 13, 1900.
H. MENDENHALL.
KNOCKDOWN FEED TROUGH.
(Application filed Sept. 27, 1900.)
(No Model.) 2 Sheets—Sheet 1.

Witnesses:
F. C. Stuart
E. G. Wilcox

Inventor: Hiram Mendenhall,
By Thomas G. Orwig, Attorney.

No. 661,937. Patented Nov. 13, 1900.
H. MENDENHALL.
KNOCKDOWN FEED TROUGH.
(Application filed Sept. 27, 1900.)
(No Model.) 2 Sheets—Sheet 2.
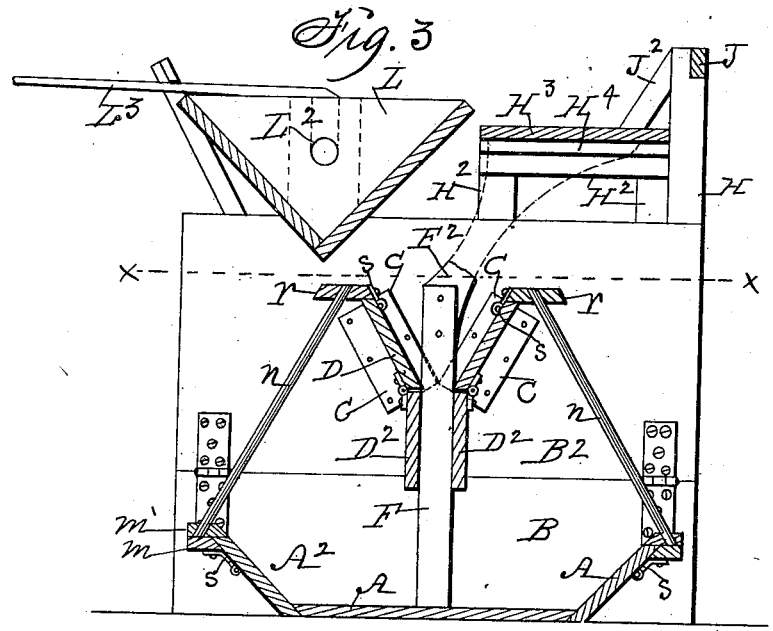
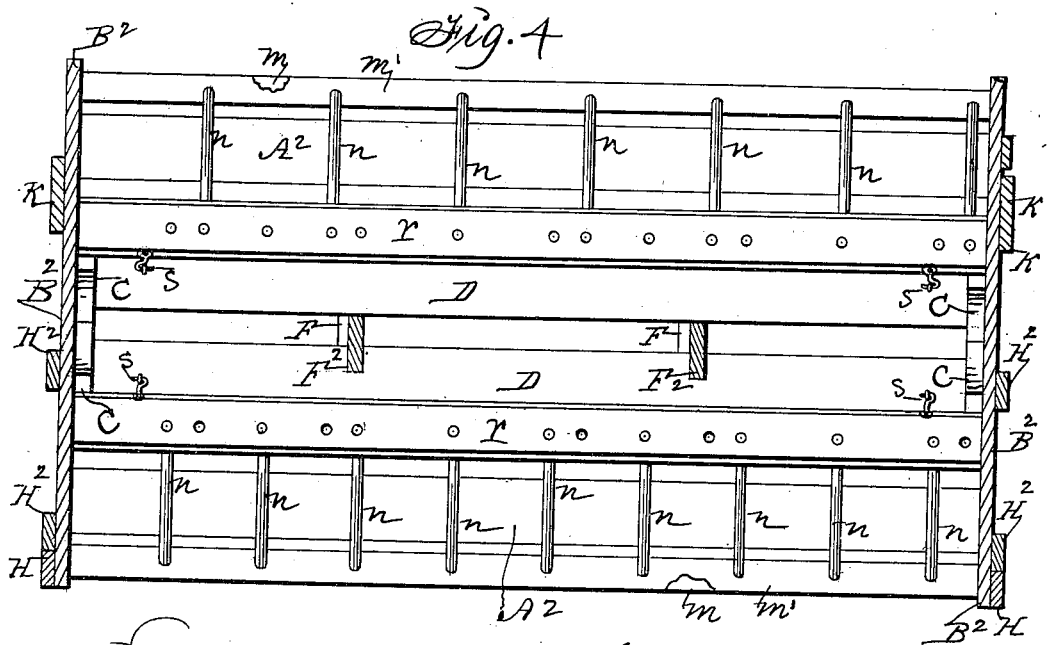
Witnesses:
F. C. Stuart,
E. G. Wilcox.
Inventor: Hiram Mendenhall,
By Thomas G. Orwig, Attorney.

UNITED STATES PATENT OFFICE.

HIRAM MENDENHALL, OF AUDUBON, IOWA.

KNOCKDOWN FEED-TROUGH.

SPECIFICATION forming part of Letters Patent No. 661,937, dated November 13, 1900.

Application filed September 27, 1900. Serial No. 31,256. (No model.)

*To all whom it may concern:*

Be it known that I, HIRAM MENDENHALL, a citizen of the United States, residing at Audubon, in the county of Audubon and State of Iowa, have invented a new and useful Portable and Adjustable Knockdown Feed-Trough, of which the following is a specification.

My object is to facilitate the labor of feeding hogs and other animals, to prevent waste incident to animals crowding each other away from a trough and dropping feed, and to detachably connect different parts, so that they can be readily separated and placed in overlying positions for convenience in moving about and economizing space in storing and shipping and also in cleaning the trough when in use.

My invention consists in the construction, arrangement, and combination of separable and adjustable parts, as hereinafter set forth, pointed out in my claims, and illustrated in the accompanying drawings, in which—

Figure 1:
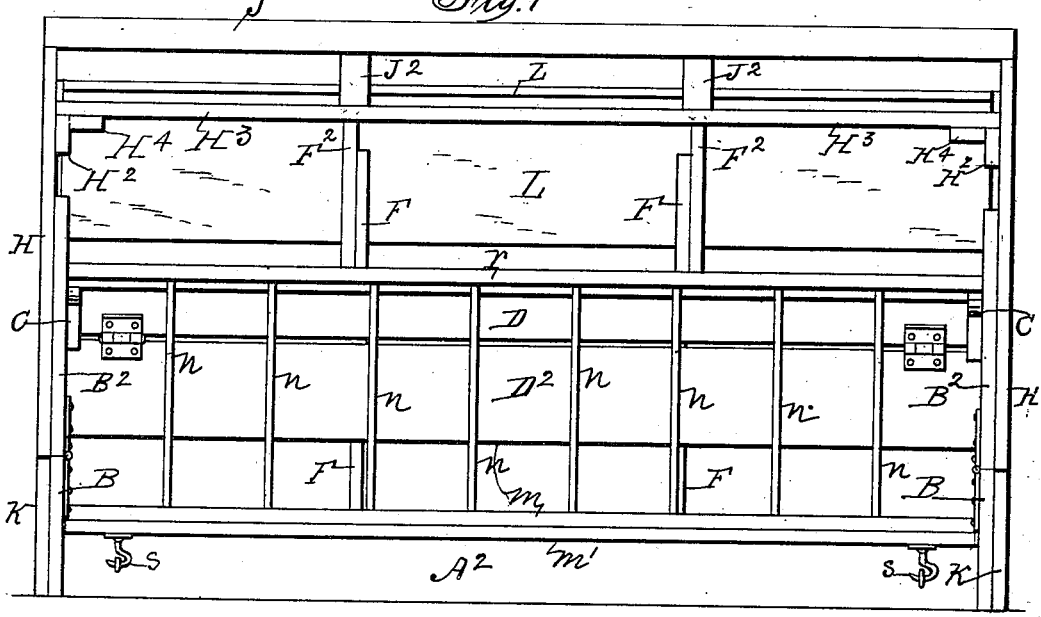
Figure 2:
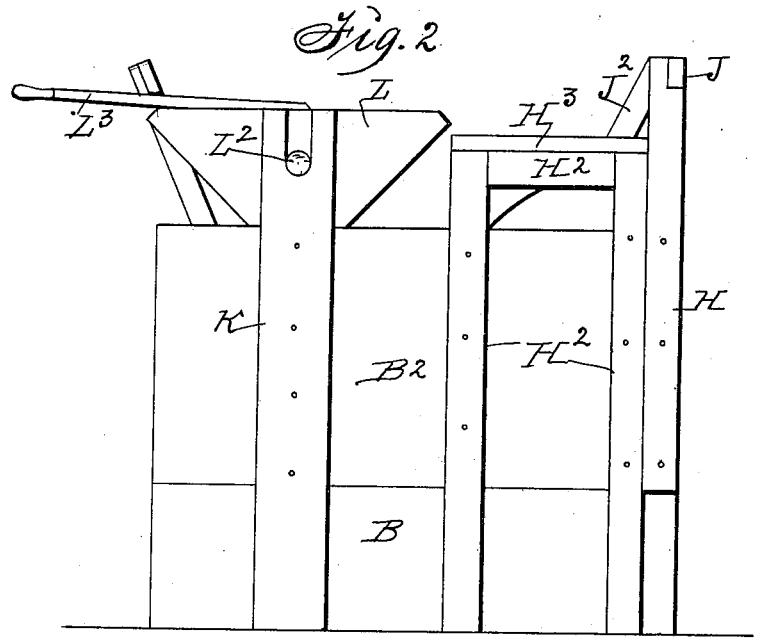

Figure 1 is a side elevation showing separable parts detachably connected as required for practical use. Fig. 2 is an end view of the structure, showing an auxiliary trough pivotally connected and a platform at its side adapted for a person to walk thereon. Fig. 3 is a transverse sectional view showing the relative positions of the different separable parts. Fig. 4 is a view looking down from the indicated line $x\ x$ in Fig. 3.

The letter A designates the bottom, $A^2$ the inclined sides, and B the ends, of a trough designed to be accessible to animals on opposite sides of the trough.

$B^2$ represents vertical extensions of the ends B and hinged to their top edges in such a manner that the extensions will fold down over the trough. The jointed ends of the structure thus produced are about twenty-four inches high and about thirty inches wide. The length of the trough may vary as required to accommodate different numbers of animals.

Cleats C are fixed to the inside faces and central portions of the hinged ends $B^2$ in parallel and inclined positions for supporting removable partitions in an elevated position above the fixed ends B of the trough, as shown in Fig. 3. Partitions corresponding in length with the trough are composed of parts D and $D^2$, hinged together in such a manner that the ends of the upper ones can be placed between the cleats C to be retained in inclined positions and to allow the lower ones to depend perpendicularly. Posts F are fitted between the partitions and rest upon the bottom A of the trough to aid in retaining the patitions in place. Brackets $F^2$ are fixed to the tops of the posts F to aid in supporting a platform. Uprights H are fixed to the hinged ends $B^2$ on their outside faces, and $H^2$ indicates frames adapted to be placed against the fixed uprights, as shown in Fig. 2, and $H^3$ is a platform that has fixed cleats $H^4$ on its under sides and end portions that engage the tops of the frames $H^2$ as required to aid in retaining the platform and frames connected.

J is a rail at the side of the platform detachably fitted and fastened to the tops of the uprights H by means of screws or in any suitable way, and $J^2$ indicates braces fixed to the rail to rest upon the platform $H^3$ to aid in keeping the parts in proper position for use. Uprights K are fixed to the outside faces of the hinged ends $B^2$ and bifurcated at their top ends to serve as supports for a trough.

L is a trough provided with journals $L^2$ on its ends that rest in the bifurcated tops of the uprights K as required to pivotally and detachably connect said trough therewith in such a manner that by means of a handle $L^3$ the trough when filled with feed can be readily inverted as required to throw the feed therefrom down between the partitions D $D^2$ and into the trough A at the bottom. Strips $m$ are fitted to the outsides and tops of the sides $A^2$ of the trough, and $m'$ indicates strips of corresponding length fixed on top of the strip $m$ in such a manner that they will overlie the top edges of the sides $A^2$, and the two strips thus united and fitted to the edge of the trough serve as the lower portion of an adjustable fender. The upper strip has perforations to admit the ends of rods $n$. The top of the fender $r$ has corresponding holes to admit the top ends of the rods $n$. The holes are in pairs, so the rods can be placed six inches apart, as shown in the lower portion of Fig. 4, or at a greater distance, as shown in the upper part of the same and as required to suit animals of different age and size and kind. The adjustable fenders thus produced are detachably fastened at their bottoms to the sides $A^2$ of the trough and to the partitions D at their tops by means of hooks and eyes $s$, so the fenders can be readily removed for gaining access to the trough to clean out corncobs and other refuse matter that may accumulate in the trough.

Having thus described the construction and combination of all the parts, the practical operation and utility of my invention will be readily understood by persons familiar with the art to which it pertains.

What I claim as new, and desire to secure by Letters Patent, is—

1. A feed-trough having fixed ends, vertical extensions hinged to the fixed ends, cleats fixed to the inside faces and central portions of the hinged extensions in inclined positions and jointed partitions detachably connected with the fixed cleats, as shown and described for the purposes stated.

2. A feed-trough having fixed ends, vertical extensions hinged to the fixed ends, cleats fixed to the inside faces and central portions of the hinged extensions in inclined positions, jointed partitions detachably connected with the fixed cleats, posts fitted between said partitions and brackets fixed to the tops of the posts to support a platform, arranged and combined as shown and described for the purposes stated.

3. A feed-trough having fixed ends, vertical extensions hinged to the fixed ends, cleats fixed to the inside faces and central portions of the hinged extensions in inclined positions, jointed partitions detachably connected with the fixed cleats, posts fitted between said partitions and brackets fixed to the tops of the posts to support a platform, frames fitted against the outside of the ends of the trough and the hinged extensions and a platform having fixed cleats on its under side fitted to the tops of said frames, arranged and combined as shown and described for the purposes stated.

4. A feed-trough having fixed ends, vertical extensions hinged to said ends, uprights fixed to the outside and ends of the vertical extensions, frames fitted to said uprights and said extensions, a platform having cleats on its under side fitted on the tops of said frames and against said uprights and a rail having fixed braces fitted and fixed to the tops of said uprights, arranged and combined as shown and described for the purposes stated.

5. A feed-trough having fixed ends, vertical extensions hinged to said ends, cleats fixed to the inside faces in inclined positions, jointed partitions fitted between said cleats, and fenders having movable rods detachably connected with the sides of the feed-trough and the tops of the partitions, arranged and combined as shown and described for the purposes stated.

HIRAM MENDENHALL.

Witnesses:
 J. M. GRAHAM,
 L. J. HILL.